United States Patent [19]

Emanuelson et al.

[11] 4,301,222

[45] Nov. 17, 1981

[54] SEPARATOR PLATE FOR ELECTROCHEMICAL CELLS

[75] Inventors: Roger C. Emanuelson, Glastonbury; Warren L. Luoma, Manchester; William A. Taylor, Glastonbury, all of Conn.

[73] Assignee: United Technologies Corporation, Hartford, Conn.

[21] Appl. No.: 181,439

[22] Filed: Aug. 25, 1980

[51] Int. Cl.³ .............................................. H01M 2/16
[52] U.S. Cl. .................................... 429/251; 429/253
[58] Field of Search ................................ 429/251, 253

[56] References Cited

U.S. PATENT DOCUMENTS 3,969,124  7/1976  Stewart ........................... 423/448 X
4,216,073  8/1980  Goldstein ........................ 429/251 X Primary Examiner—Charles F. LeFevour
Attorney, Agent, or Firm—Stephen E. Revis

[57] ABSTRACT

A thin electrochemical cell separator plate with greatly improved properties is made by molding and then graphitizing a mixture of preferably 50 percent high purity graphite powder and 50 percent carbonizable thermosetting phenolic resin, the graphite molding powder particles having a specified preferred shape and a size distribution requiring 31 to 62 weight percent of the particles to be less than 45 microns in size.

11 Claims, 3 Drawing Figures

CARBONIZING HEATING SCHEDULES

| CURVE A | |
|---|---|
| TEMP. RANGE | TIME, HOURS |
| AMB.-350 F | 2.7 |
| 350-390 F | 15.1 |
| 390-700 F | 11.8 |
| 700-1100 F | 47.4 |
| 1100-1850 F | 9.0 |
| 1850-HOLD | 5.0 |

| CURVE B | |
|---|---|
| TEMP. RANGE | TIME, HOURS |
| AMB.-350 F | 2.7 |
| 350-390 F | 15.1 |
| 390-650 F | 9.7 |
| 650-700 F | 7.1 |
| 700-750 F | 10.0 |
| 750-800 F | 12.5 |
| 800-1000 F | 66.7 |
| 1000-1110 F | 22.0 |
| 1110-1850 F | 7.4 |
| 1850-HOLD | 5.0 |

FIG. 1 CARBONIZING HEATING SCHEDULES

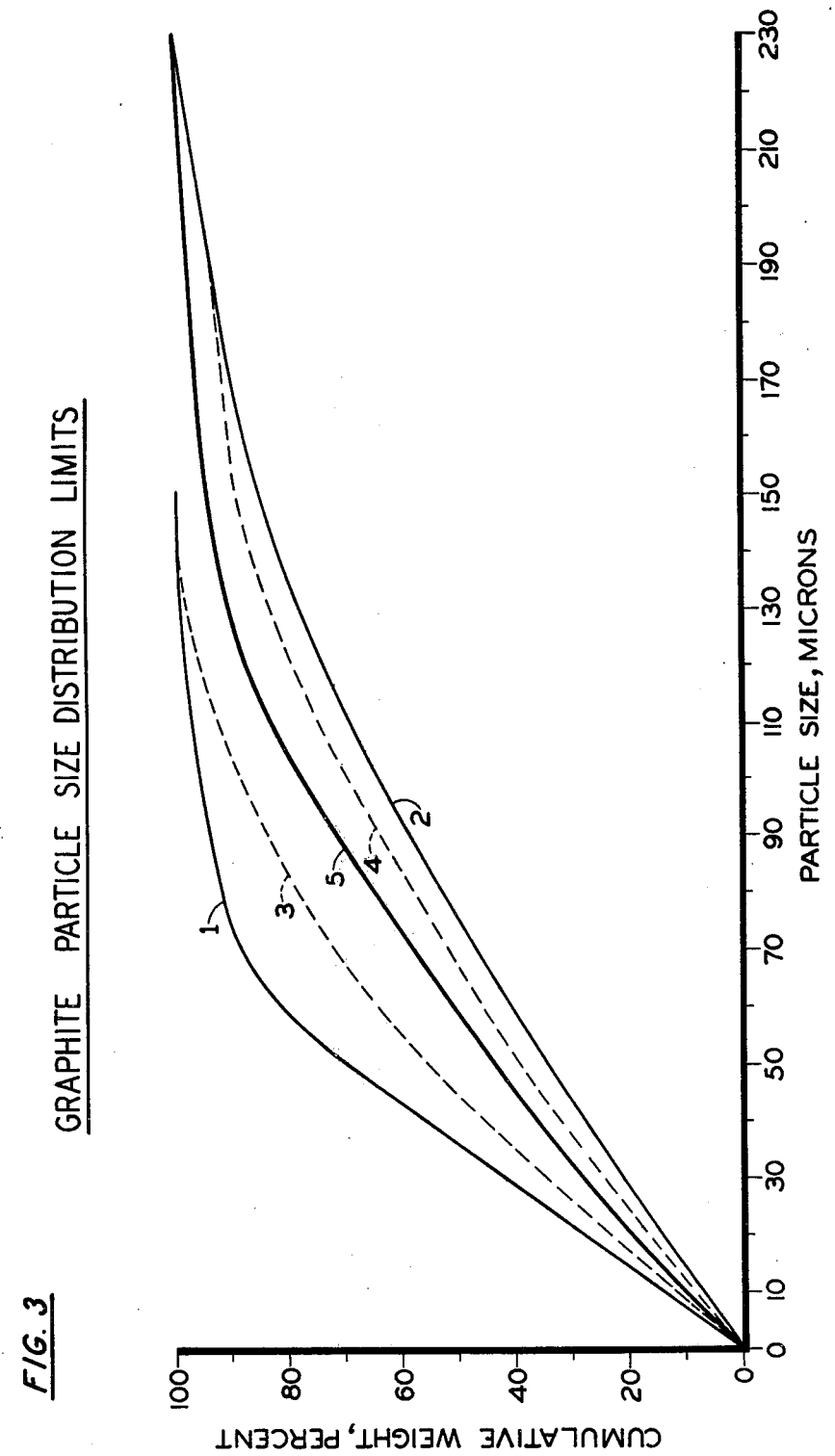

SEPARATOR PLATE FOR ELECTROCHEMICAL CELLS

TECHNICAL FIELD

This invention relates to separator plates for use in batteries and other electrochemical cell devices and to methods for making these plates.

BACKGROUND ART

Separator plates are well known coponents of batteries and other electrochemical devices. In these devices they are used to separate adjacent cells. In fuel cells, for example, they serve the function of preventing the mixing of a fuel gas, such as hydrogen, disposed on one side of the plate, with an oxidant, such as air, disposed on the other side thereof. They must, therefore, be highly impermeable to a gas such as hydrogen and highly electrically conductive. It has been particularly difficult developing separator plates for use in phosphoric acid electrolyte due to the highly corrosive nature of the acid, particularly at high temperatures. Only a few years ago fuel cells operated at temperatures between 275° F. (135° C.) and 325° F. (163° C.). Today there is a need for phosphoric acid electrolyte fuel cell separator plates to be corrosion resistant to the electrolyte for long periods of time (years) at operating temperatures as high as 425° F. (218° C.); and they must be strong, particularly in terms of flexural strength, which is an indication of the plates' ability to withstand high pressure loads, differential thermal expansion of mating components, and numerous thermal cycles without cracking or breaking. It has also been desirable to make these plates thinner for improved electrical and thermal conductivity and for more economical and more versatile fuel cell configurations. This makes them even more difficult to fabricate with the requisite strength and impermeability.

Graphite is one of the few known relatively inexpensive substances highly resistant to corrosion in hot phosphoric acid. There is considerable prior art relating to dense graphite articles made by molding and then heat treating mixtures of graphite or carbon powder and a carbonizable resin. Representative of this art are the following U.S. Pat. Nos. 3,283,040; 3,708,451; 3,838,188; 3,907,950; 3,969,124; 3,624,569; and 3,716,069. The last two of the above-listed patents are owned by the same assignee as the present application and are specifically directed to molding separator plates and the like for use in phosphoric acid fuel cells. Although there are some common threads running through these above-mentioned references, the distinctions are even more notable. For example, in U.S. Pat. No. 3,708,451 a quantity of camphor is mixed with the graphite and resin prior to molding and is considered critical to obtaining a graphite product having a "virtually impermeable surface". A resin content of from 30–60 weight percent is indicated, with examples of possible resins being polymerized furfuryl alcohol, pitch and furans, none of which are believed to be totally acceptable for use in phosphoric acid cells. The patent teaches that the graphite might be in the form of a powder with all the particles being less than 5 microns (for a smooth surface) or having a range up to 500 microns; or graphite fibers may also be used.

In U.S. Pat. No. 3,283,040 a mixture of nongraphitic carbon (i.e., lampblack or carbon black) and coal tar pitch are molded to form a carbon body which is graphitized by heating. Densities of up to 1.71 gm/cc are achieved.

U.S. Pat. No. 3,907,950 is concerned with making "spark erosion electrodes". The electrodes are molded from a blend of not more than 14 percent carbonizable resin (such as a novolac resin) and graphite powder having a particle size of less than 200 mesh (174 microns). Densities of up to 1.70 gm/cc were attained. There is nothing in this patent which would appear to be relevant to a person having skill in the fuel cell art as regards the composition and fabrication of a fuel cell separator plate. The same is true for U.S. Pat. No. 3,838,188 which is also concerned with molding carbonaceous electrical discharge machining electrodes.

U.S. Pat. No. 3,969,124 describes molding and subsequently graphitizing a mixture of non-graphitic carbon and graphite particles and a phenolic resin to form electrodes, anodes and crucibles. The patent teaches 20–50 percent resin, with 20–25 percent being preferred. The patent does recognize that the graphite particle size distribution can and does have an effect on the properties of the finished article. It indicates that 50% of the particles must be less than 10 microns in diameter. Chemical vapor deposition is recommended for increasing the density, and it is recommended that 10–30 percent graphite fibers or whiskers be added to the molding mixture for increased strength.

U.S. Pat. No. 3,634,569 is directed to molding thin graphite plates useful as separator plates in phosphoric acid fuel cells. The recommended molding mixture is 5–25 percent thermosetting phenolic resin binder and 75–90 percent powdered graphite. A recommended graphite particle size distribution is set fourth in Table I and calls for a maximum of 12 percent of the particles being below 50 microns. A plate made by the process is described in Example I of that patent; and some of its properties are listed in column 1 of Table II of that patent. Note that this plate is not graphitized since the maximum heat treat treatment temperature was about 400° F. (205° C.).

U.S. Pat. No. 3,716,609 describes a process for forming fuel cell separator plates from a molding mixture comprising 60–90 percent graphite powder and 10–40 percent polyphenylene sulfide (PPS) resin particles. A preferred composition is 85 percent graphite powder and 15 percent resin powder. Particle size distributions for both the resin and the graphite are taught. Note that the maximum permitted amount of particles in the smaller than 45 micron size range was about 20 percent. This was the best plate known prior to the present invention. However it was designed for long term operation in phosphoric acid at temperatures not exceeding about 325° F. The plate is not and cannot be subject to graphitization temperatures since above 600° F. PPS loses all its strength and shape holding characteristics. Some properties and characteristics of parts made by the described process are set forth in Table II of that patent.

Despite this plethora of art in the field of dense carbon articles and fuel cell separator plates, there is no teaching of a thin plate which can withstand use over an extended period of time in the environment of phosphoric acid fuel cell operating at temperatures greater than about 325° F.

DISCLOSURE OF INVENTION

An object of the present invention is an improved, thin separator plate for use in electrochemical cells, particularly phosphoric acid fuel cells.

According to the present invention a thin, fully graphitic, electrochemical cell separator plate is claimed which is made by molding and then heat treating a mixture comprising 45-65 weight percent graphite particles and 55-35 weight percent carbonizable thermosetting resin having a carbon yield of at least 50 percent, wherein the graphite particles have an initially high density, a low average aspect ratio, and a distribution of particle sizes up to about 230 microns with between 31 and 62 weight percent of the particles having a size less than 45 microns.

Although the following discussion is directed toward separator plates particularly adapted for use in a phosphoric and fuel cell environment, this is done for the purpose of description only, since the plate of the present invention may be used in many other electrochemical cell enviroments, such as in batteries and in electrolysis cells.

Efforts by others to develop a very high quality separator plate less than about 0.150 inch thick for use in phosphoric acid electrolyte fuel cells operating at temperatures above 325° F. have, until now, been unsuccessful. While the prior art has recognized that many factors affect the properties of graphite articles fabricated by molding and heat treating a mixture of carbon or graphite and carbonizable resin, the various teachings have been inconsistent. Although prior art plates might have been adequate for long term use in prior art cells which operated at sustained temperatures of only about 325° F., they are not suited for and would not survive for long in today's phosphoric acid cells which operate at temperatures up to 425° F. This is true even though prior art plates were generally much thicker than plates of the present invention.

We have found that the composition of the molding mixture, more specifically the relative amounts of graphite and resin in combination with certain characteristics of the graphite powder and the type of resin, is critical to obtaining a high quality, long lasting, thin separator plate. For example, it has been found that desired results can only be achieved using a thermosetting carbonizable phenolic resin having a carbon yield of greater than 50 percent. Although this is not the first teaching of the use of a phenolic resin for making separator plates (see discussion of U.S. Pat. No. 3,634,569 above), it has been determined that it is necessary to use this type of resin to obtain the desired results. Furthermore, it has been determined that satisfactory properties are attainable only when the plate is made from 45-65 weight percent graphite (most preferably 50-60 percent) and 55-35 weight percent resin (most preferably 50-40 percent). A 50-50 mixture is best. Compare this to U.S. Pat. Nos. 3,634,569 which recommends 5-25 percent phenolic resin, and to 3,716,609 which recommends 10-40 percent polyphenylene sulfide resin with 15 percent being preferred.

As regards graphite powder characteristics, it has been found that the particle size distribution, the purity of the graphite, the graphite particle density, and even the graphite particle shape are critical in obtaining a superior, thin phosphoric acid fuel cell separator plate. Thus, an appropriate particle size distribution, described in detail hereinbelow, is necessary to attaining acceptable packing density and to encourage a uniform resin distribution on a microscale. Graphite purity has been found to be very critical in the production of defect free separators of high corrosion resistance which will not ultimately contaminate the fuel cell electrolyte and the fuel cell catalyst during use. To obtain highly desirable electrical and thermal properties, as well as to ensure an impervious structure in the finished separator, it has been found necessary to use fully graphitic particles having a density of at least 2.0 gm/cc; less dense graphite (i.e., density 1.7-1.9 gm/cc) yields plates which are too porous and weak. Finally, and quite surprisingly, as discussed in greater detail hereinbelow, it is critical that the particles, on average, are more granular than rodlike or platelike.

The foregoing and other objects, features and advantages of the present invention will become more apparent in the light of the following detailed description of the preferred embodiments thereof.

BRIEF DESCRIPTION OF DRAWING

FIG. 3 is a graph showing acceptable graphite particle size distributions for graphites used in fabricating the separator plates of the present invention.

BEST MODE FOR CARRYING OUT THE INVENTION

Figure 1:
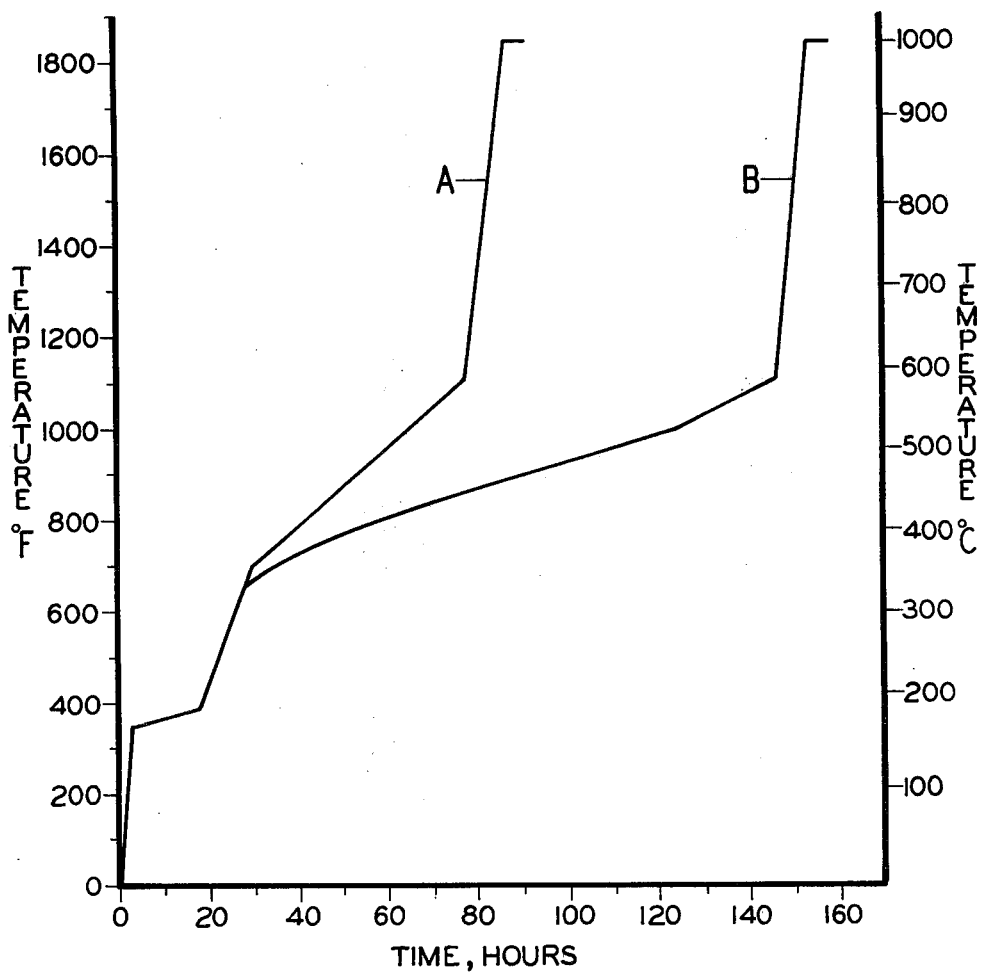
FIG. 1 is a graph showing two carbonizing cycles which may be used in fabricating separator plates of the present invention.

In order for phosphoric acid electrolyte fuel cells to meet the criteria of a demanding commercial marketplace, separator plates for these cells are required to meet high standards in terms of many different characteristics or properties such as: (1) hydrogen permeability; (2) corrosion resistance; (3) electrical resistivity; (4) thermal conductivity; (5) strength; and (6) electrolyte absorption resistivity. Prior art plates have achieved satisfactory levels of performance in some areas; but attaining commercially acceptable characteristics in all critical areas, simultaneously, has not, until now, been achievable. Also, as hereinabove mentioned, efforts have been directed to making these plates thin and this has compounded problems such as attaining adequate strength, hydrogen impermeability and long life. Plates of the present invention, having excellent properties, are no greater than 0.150 inch thick; are preferably less than 0.100 inch thick; and are most preferably less than 0.050 inch thick. In the following description, various features and properties of the separator plates of the present invention are described; and each is discussed in relation to the role it plays in the proper functioning and life expectancy of the cell. Plates as large as 25 inches by 27 inches have been made in accordance with the teachings of the present invention.

PLATE PROPERTIES

Hydrogen Permeability:

Hydrogen permeability is the rate at which hydrogen gas passes through a unit area of the separator plate in a direction perpendicular to the plate surface. It is indirectly a measure of the size and number of small pores through the thickness of the plate. Very low permeability is required to maintain separation of the oxidant and hydrogen disposed on opposite sides of these plates, which may be less than 50 mils thick. Hydrogen permeability is measured by applying hydrogen gas to one side of the plate and measuring the percent hydrogen in a known sweep gas passing over the opposite side at a known rate. Separator plates according to the present invention have a hydrogen permeability less than 0.03 cc $H_2/ft^2/sec$. and preferably less than 0.02 cc $H_2/ft^2/sec$.

Thermal Conductivity:

Separator plates must be highly thermally conductive in order to aid in the uniform distribution and/or removal of heat generated during cell operation. For plates on the order of 0.150 inch thick, an acceptable in-plane thermal conductivity would be about 20 BTU/hr ft°F. Plates according to the present invention have an in-plane thermal conductivity of at least 40 BTU/hr ft°F., which makes them more adequate to meet present requirements. Thru-plane thermal conductivity of the plates of the present invention is at least about 20 BTU/hr ft°F. The best prior art plates have thermal conductivities on the order of only half those of the present invention.

Electrical Resistivity:

In a stack of fuel cells it is required that current pass uniformly and with little resistance from cell to cell through the separator plates in a direction both thru-plane (i.e. perpendicular to their thickness) and in-plane for the purpose of efficient, uniform, cell-to-cell current transport. High resistivity results in increased voltage losses and overall loss of cell efficiency. Plates of the present invention have thru-plane resistivity which is no more than 0.009 ohm-cm and in-plane resistivity of no more than 0.002 ohm-cm. Note the thru-plane electrical resistivity of 0.011 ohm-cm for plates made according to U.S. Pat. No. 3,716,609 (Table II) discussed above. While that level of resistivity would be acceptable for most cells, lower resistivity has always been obtained with plates of the present invention.

Strength:

There are several strength requirements for separator plates. These are flexural strength, tensile strength, compressive strength, and shear strength. Having acceptable flexural strength is perhaps the most important criteria. Flexural strength is a measure of the plate' ability to withstand bending stresses without cracking. There is a strong correlation between plate life expectancy and flexural strength. A minimum initial acceptable strength is about 4000 psi. Initial flexural strength at 400° F. (205° C.) for plates of the present invention is at least 5500 psi and typically 6000 psi. In combination with good corrosion resistance, plates of the present invention will maintain their integrity and still have adequate flexural strength after 40,000 hours of cell operation at about 400° F.

Corrosion Resistance:

Corrosion resistance is directly correlated to threshold corrosion potential which is an excellent measure of the life expectancy of the finished part. The threshold corrosion potential is the electrochemical potential (relative to a standard hydrogen electrode) at which there is a rapid increase in current due to corrosion of the carbon to form CO and $CO_2$. Several factors, such as the purity of the graphite, purity and type of the resin, and heat treatment process (particularly the maximum temperature) have an effect on the magnitude of the threshold corrosion potential. For example, the corrosion potential of plates in 400° F. phosphoric acid increases (i.e. improves) as heat treatment temperature increases up to a temperature of about 5072° F. (2800° C.). Plates of the present invention will have an initial threshold corrosion potential (measured at 400° F.) of greater than 1000 millivolts; and typically will have a threshold corrosion potential of between 1100–1200 millivolts.

Electrolyte Take-Up (ETU):

ETU is a measure of how quickly and the extent to which a plate absorbs electrolyte. Since the presence of electrolyte within the pores of the plate increases the rate at which the plate corrodes, and because electrolyte absorbed by the plate is electrolyte which is not used for its intended purpose, ETU must be very low even after a long period of operation. For the purposes of the present specification and claims, electrolyte take-up or ETU is defined as the weight increase of the plate (expressed as a percent of its original weight) after running the plate in a phosphoric acid (105%) cell stack at 400° F. for at least 300 hours. Additional running time has little or no effect on ETU. Plates of the present invention will have an ETU of no more than 3.0 percent. An ETU of less than about 5.0 percent is considered acceptable.

It should be realized that some of the foregoing properties are interdependent. For example, there is a direct correlation between hydrogen permeability and ETU, such that if ETU is acceptably low, hydrogen permeability is usually also acceptably low. Similarly, plates which have a low electrical resistivity also have high thermal conductivity. For this reason some separator plate characteristics have not been discussed, as they will of necessity be acceptable if certain other properties are present.

PLATE FABRICATION MATERIALS

Graphite/Resin Ratio:

As briefly discussed above, the improved separator plates need to be molded from a mixture comprising graphite powder and thermosetting carbonizable phenolic resin in the proportion of 45–65 weight percent graphite powder and 55–35 weight percent resin, with a 50–60 weight percent graphite 50–40 weight percent resin mixture being preferred, and a 50–50 mixture being most preferred. Detrimental effects have been observed for many of the above discussed properties when these proportions are not adhered to. Laboratory test data on plate sections heat treated to 2100° C. (the lowest acceptable graphitizing temperature) and having resin contents of 40 or 50 percent, demonstrate significantly improved properties when compared to plates made with 20 or 30 percent resin. For example, flexural strength with 50 percent resin is approximately twice that with b 20 percent resin. Hydrogen permeability and ETU for plates made with 20 or 30 percent resin can be expected to have about three times the hydrogen permeability and ETU of plates made with 40 or 50 percent resin.

The Resin:

Although the reasons are not fully understood, the resin must be a thermosetting, carbonizable phenolic resin having a carbon yield of greater than 50 percent; but a preferred phenolic resin is one which is either a phenyl-aldehyde resol or a phenyl-aldehyde novolac as shown in U.S. Pat. No. 3,109,712. These preferred resins may be prepared by the condensation of a variety of phenyls and aldehydes as described in "The Chemistry of Synthetic Resins" by Carleton Ellis, Vol. 1, Chapters 13–18, Reinhold Publishing Company, New York, New York (1935). The preferred phenyl is phenyl itself although its various homologs or nuclear substituted derivatives may be used. Typical aldehydes that may be used are formaldehyde, paragormaldehyde, acetaldehyde, butyraldehyde, benzaldehyde, furfuraldehyde, terphthaldehyde, etc.

A novolac resin may be produced by using 0.55–0.9 mols of aldehyde per mol of phenyl. Such a resin is available commercially from Plastics Engineering Company, Sheboygan, Wisconsin as Resin No. 1339. A novolac resin is a two-stage resin and requires reaction with additional aldehyde or another bridging agent to produce a thermoset resin. One such bridging agent is hexamethylenetetramine and, in the present invention, it or some other modifier would be mixed in with the novolac resin and graphite prior to molding. A resol resin is a one-stage resin since it has sufficient aldehyde reaction therein to form a thermoset resin by continued heating. Such a resin is available commercially from Plastics Engineering Company as Resin No. 1422.

The Graphite:

The carbon powder used to make the plates of the present invention must be substantially 100 percent graphite. The characteristics and properties of the graphite powder used in the molding of the fuel cell separator plates of the present invention are critical to attaining the desired properties and characteristics in the finished plate. Graphite particle size, shape, purity, and density are all important, as discussed in detail below.

Graphite Particle Size Distribution:

Curves 1 and 2 in FIG. 3 show outer boundaries of graphite particle size distributions which produce acceptable properties in the fuel cell separator plates of the present invention. Any graphite having a graphite particle size distribution which plots as a reasonably smooth curve within the boundaries of curves 1 and 2 (such as curves 3, 4 and 5) should produce a plate with acceptable density and will encourage a uniform resin distribution on a microscale (i.e., around each individual graphite particle).

The most important and critical aspect of the particle size distribution is the required high percentage of small particles. As shown in FIG. 3, it is required that the graphite comprise between 31% and 62%, by weight, particles which are 45 microns or less in diameter. In curve 1 note that 95% of the particles are less than 100 microns in size.

Curves 3 and 4 define the outside limits of the preferred particle size distribution. Curve 5 is our most preferred particle size distribution, and is the typical particle size distribution for Airco Speer Grade 60 graphite powder. Using curves 3 and 4 as a guide, an estimated preferred particle size distribution is set forth in the table below.

TABLE

PREFERRED GRAPHITE PARTICLE SIZE DESTRIBUTION

| PARTICLE SIZE RANGE (MICRONS) | WEIGHT PERCENT |
| --- | --- |
| greater than 230 | less than 0.5 |
| greater than 200 | less than 5.0 |
| greater than 150 | less than 12.0 |
| 100–150 | 5.0–30.0 |
| 45–100 | 19.0–52.0 |
| less than 45 | 35.0–50.0 |

Graphite Particle Shape:

Surprisingly, the shape of the graphite particles has a significant effect on the properties and characteristics of the finished separator plate. It has been determined that particles which tend to be granular (i.e., three-dimensional rather than like small flat plates or long rods which tend to be two-dimensional) minimize the likelihood or extent to which the graphite particles take on a preferred orientation within the plate during lateral material flow at the time of molding. Preferred graphite orientation has been demonstrated to cause nonuniform shrinkage during carbonizing due to induced resin maldistribution. The nonuniform shrinkage is exhibited as severe surface roughness, cracks and increased brittleness in the finished separator plates.

To determine particle shape, the longest and shortest dimensions of a significant number of particles are measured from a photomicrograph of a sample of the graphite powder. What is herein defined as an "aspect ratio" for each particle is calculated as the difference between the longest and shortest measurement divided by the longest measurement. Note that a spherical particle would have an aspect ratio of 0.0. The aspect ratio of a rod-like or a plate-like particle will, of course, depend upon its particular orientation in the photograph; however, on average these particles will have aspect ratios well in excess of 0.5. For purposes of the present invention the aspect ratios for all the measured particles are added together, and the sum is divided by the total number of particles measured to arrive at an "average aspect ratio" for the powder. It must be kept in mind that most graphite powders will have a mixture of sphere-like (granular), rod-like, and plate-like particles, so that the average aspect ratio is actually an indication of the relative proportion of sphere-like particles to rod-like and plate-like particles. Separator plates have been made using powder mixtures having average aspect ratios of 0.45, 0.51, and 0.53; and these plates were unacceptable. Acceptable plates were made using Airco Speer Grade 60 graphite powder made by Airco Carbon Co., St. Mary's, Pennsylvania and having an average aspect ratio of 0.34. Acceptable plates have also been made using a mixture of Asbury 4234 and Asbury A-99 graphite powder in proportion, by weight, of 65/35. These graphites had average aspect ratios of 0.35 and 0.38, respectively. To be acceptable for purposes of the present invention it is believed the graphite powders should have average aspect ratios of less than 0.40.

Graphite Purity:

Very high purity graphite powder is critical to obtaining satisfactory plates. As used herein, an impurity is any material, other than graphite, which melts, evaporates, decomposes or interacts with either the graphite, the resin as it decomposes, or with the carbonized resin; or which ignites during carbonizing or graphitizing of the plate. These types of impurities cause voids or pin holes through the finished plate. An impurity may also be foreign material remaining in the separator which is not chemically or electrically compatible with the fuel cell environment, resulting in a higher corrosion rate or contamination of the electrolyte and ultimately the fuel cell catalyst. The most harmful impurities are lead, copper, bismuth, silver, cadmium, mercury and arsenic. The total amount of these impurities should not exceed about 100 ppm and is preferably less than 20 ppm. Other less harmful impurities include silicon, iron, sodium and potassium. The total of all impurities in the graphite powder must not exceed 1500 ppm and is preferably less than 900 ppm, since too high a total will result in an excessively porous plate due to the volatilization of these impurities during heat treatment. Notwithstanding the foregoing, impurities cannot be tolerated in any amount which comprise particles greater than about 10 mils, as these particles would cause large, unacceptable defects in the finished plates.

Graphite Particle Density:

The density of the graphite particles is also critical to the present invention. A particle density of 2.0 gm/cc is needed to assure acceptable plates. ETU, corrosion rate, and electrical and thermal conductivity are all adversely affected by too low a particle density.

PLATE FABRICATION

To fabricate a separator plate a well blended mixture of the appropriate resin and graphite powder, as described above, is distributed in a mold. This molding compound is compacted under pressure and temperature to melt and partially cure the resin and produce material flow such that the desired thickness and the desired density of 97-99 percent of the maximum theoretical density for the particular graphite/resin mixture used has been attained. The molded plate is then removed from the molding environment and may be microground to reduce its thickness to a desired predetermined value, with a thickness variation to within ±0.001 inch. Silicon carbide sandpaper (180 grit) is generally used for this microgrinding operation. The uniform shrinkage which is experienced in the below described heat treating steps allows this microgrinding operation to be done before heat treating. There is no reason why the plate could not be molded directly to the required thickness value within ±0.001 inch, except that it is not economically practical.

After molding and microgrinding, a plurality of the plates are simultaneously carbonized (i.e., the resin is converted to vitreous carbon) by stacking them in a suitable gas-tight enclosure wherein they are heated, at programmed rates, in an inert atmosphere. Sufficient dead weight is applied vertically to each stack to maintain plate flatness during the shrinkage period that occurs as the resin decomposes. The plate edges in the stack must be flush with each other and the plates must be fully supported to maintain separator flatness. When the temperature reaches between 980-1090° C. the resin has been almost completely converted to vitreous carbon. FIG. 1 shows two acceptable heating schedules (A and B) for carbonizing plates which were initially molded from 50-50 resin/graphite mixtures. Care must be taken in carbonizing the plates since too rapid heating rates can cause excessive buildup of decomposition product vapor pressure, which can rupture the plates causing blisters and/or cracks therein.

Figure 2:
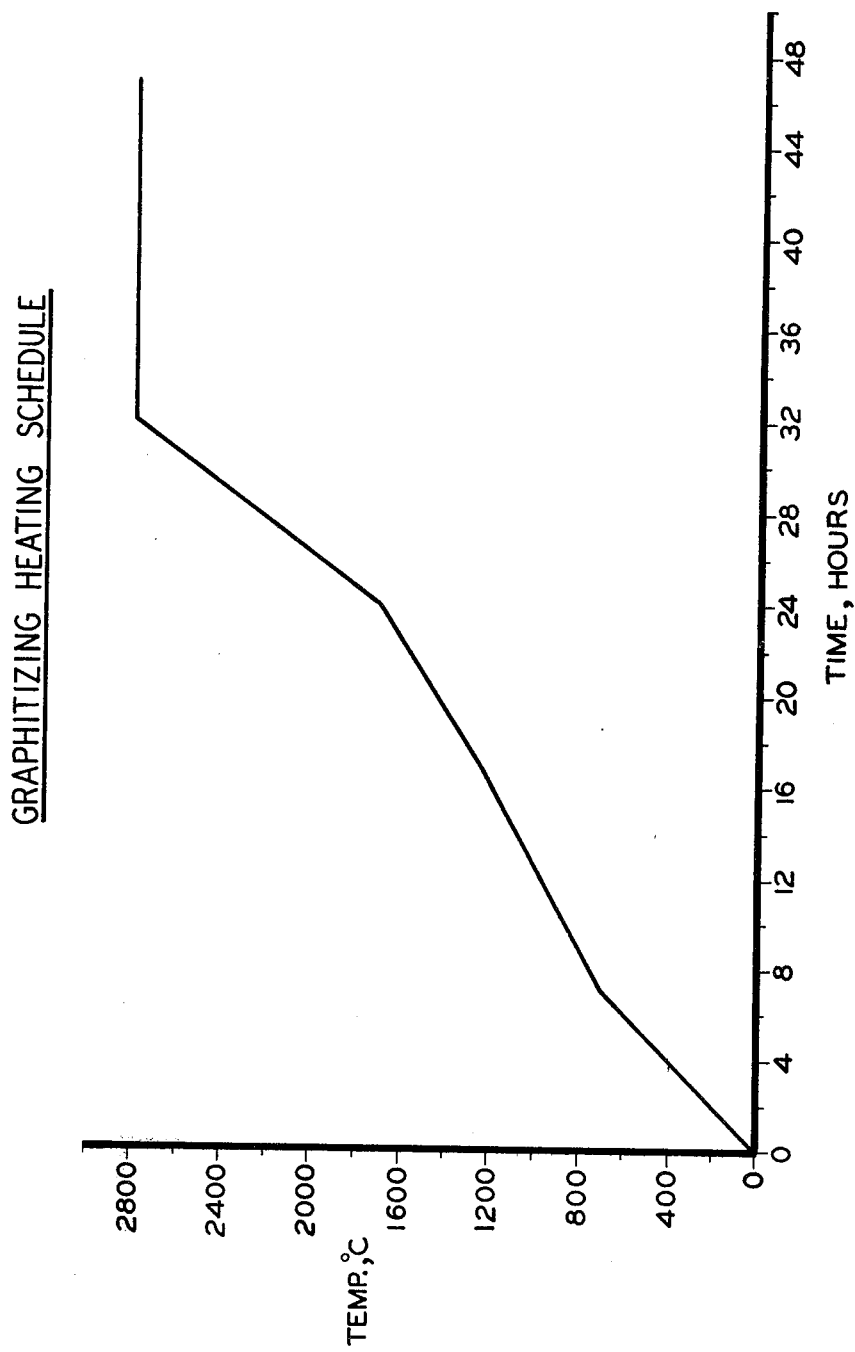
FIG. 2 is a graph showing a graphitizing cycle which may be used in fabricating separator plates of the present invention.

In order to obtain adequate corrosion protection and to improve the threshold corrosion voltage, electrical resistivity, and thermal conductivity, and to further reduce hydrogen permeability, the plate must be further heated (i.e., graphitized) to at least about 2100° C. and preferably to 2800° C. This can be done in a high temperature resistance or induction furnace. The carbon begins to be converted to graphite at a temperature of about 2000° C. A suitable graphitizing heating schedule is shown in FIG. 2.

The following Example describes a separator plate made in accordance with the teachings of the present invention:

EXAMPLE

A 6.0 inch by 6.0 inch by 35 mil. thick separator plate was made from a 50-50 (by weight) mixture of graphite and phenolic resin. The graphite was Airco Speer Grade $\alpha$graphite powder, and the resin was Reichhold 24-655 phenolic resin made by Varcum Chemical, Division of Reichhold Chemicals, Inc., Niagara Falls, New York. Curve 5 in FIG. 3 is typical of the particle size distribution of Airco Speer Grade 60 graphite powder, which has a density of 2.2 gm/cc and an impurity level within the preferred ranges discussed above. The plate was compression molded at 300° F. (149° C.), and 5000 psi for 5.0 minutes. It was then carbonized in accordance with the cycle represented by the curve B of FIG. 1 and graphitized according to the curve shown in FIG. 2. The finished plate had the following characteristics: flexural strength 6773 psi; open porosity 8.7%; in-plane thermal conductivity 59 BTU/hr ft°F; in-plane electrical resistivity $0.17 \times 10^{-2}$ ohm-cm; thru-plane electrical resistivity $0.87 \times 10^{-2}$ ohm-cm; threshold corrosion potential 1140 mv; and plate density 1.88 gm/cc. Electrolyte take-up, although not measured for this particular plate, is believed to be well within acceptable limits based upon experience with other plates made using the same resin, and also based upon the measured density and open porosity.

Although the invention has been shown and described with respect to preferred embodiments thereof, it should be understood by those skilled in the art that various changes and omissions in the form and detail thereof may be made therein without departing from the spirit and the scope of the invention.

We claim:

1. An electrochemical cell separator plate having a thickness no greater than 0.150 inch and having been made by molding and then heat treating a mixture comprising high purity graphite powder and a carbonizable thermosetting phenolic resin in a proportion 45-65 parts by weight graphite and 55-35 parts by weight resin, said graphite powder consisting of substantially 100% fully graphitic particles having a density of at least 2.0 gm/cc, an average aspect ratio of less than about 0.40, and a distribution of particle sizes up to a maximum of about 230 microns, with between 31 to 62 weight percent of the particles having a size less than 45 microns, said resin having a carbon yield of at least 50 percent, said finished plate having been graphitized to at least 2100° C. and having an initial threshold corrosion potential at 400° F. of at least 1,000 millivolts, a maximum initial thru-plane electrical resistivity of 0.011 ohm-cm, an initial flexural strength at 400 ° F. of at least 4000 psi and an electrolyte takeup no greater than 5.0 percent.

2. The separator plate according to claim 1 wherein said high purity graphite powder is a graphite which includes less than 1500 ppm total impurities, no impurities having a particle size of greater than 10 mils.

3. The separator plate according to claim 1 wherein the graphite powder in the molding mixture has a particle size distribution wherein 35-50 weight percent of the particles are less than 45 microns, 19-52 weight percent are between 45-100 microns, 5-30 weight percent are between 100-150 microns, less than 12 weight percent are greater than 150 microns, less than 5 weight percent are greater than 200 microns, and less than 0.5 weight percent are greater than 230 microns.

4. The separator plate according to claim 1 wherein the finished separator plate has an initial threshold corrosion potential of at least 1100 millivolts.

5. The separator plate according to claim 1 wherein said high purity graphite powder comprises less than 900 ppm impurities, the initial threshold corrosion potential is at least 1100 millivolts, electrolyte take-up is no greater than 3.0 percent, the initial flexural strength at 400° F. is not less than 5500 psi, and the maximum initial in-plane electrical resistivity is 0.002 ohm-cm.

6. The separator plate according to claim 1 wherein the finished plate is not greater than 0.100 inch thick.

7. The separator plate according to claim 1 wherein the initial hydrogen permeability of the plate is no greater than 0.03 cc/ft$^2$/sec.

8. The separator plate according to claims 1, 3, 4, 5, 6 or 7, said plate having been made by molding and then heat treating a mixture comprising 50-60 weight percent of said graphite and 50-40 weight percent of said resin.

9. A fuel cell separator plate for use in phosphoric acid electrolyte fuel cells, said plate having a thickness no greater than 0.050 inch and having been made by molding a mixture comprising 50-40 weight percent carbonizable thermosetting phenolic resin, said graphite powder comprising less than 900 ppm impurities and consisting of graphite particles having a density of at least 2.0 gm/cc, an average aspect ratio of less than about 0.40, and a particle size distribution wherein 35-50 weight percent of the particles are less than 45 microns, 19-52 weight percent are between 45-100 microns, 5-30 weight percent are between 100 and 150 microns, less than 12 weight percent are greater than 150 microns, less than 5 weight percent are greater than 200 microns, and less than 0.5 weight percent are greater than 230 microns, said resin having a carbon yield of at least 50 percent, said finished plate being fully graphitic, having an initial threshold corrosion potential of at least 1100 millivolts, a maximum initial thru-plane electrical resistivity of 0.009 ohm-cm, an initial flexural strength of 400° F. of at least 5500 psi, and electrolyte take-up no greater than 3.0 percent, and an initial hydrogen permeability of no greter than 0.03 cc/ft$^2$/sec.

10. The separator plate according to claim 9, said plate having been molded from a mixture comprising about 50 weight percent of said graphite powder and 50 weight percent of said phenolic resin.

11. The separator plate according to claim 10 wherein said finished plate has an initial hydrogen permeability of no greater than 0.02 cc/ft$^2$/sec.

* * * * *

UNITED STATES PATENT AND TRADEMARK OFFICE
CERTIFICATE OF CORRECTION

PATENT NO. : 4,301,222
DATED : November 17, 1981
INVENTOR(S) : Roger C. Emanuelson et al It is certified that error appears in the above—identified patent and that said Letters Patent is hereby corrected as shown below:

Column 5, line 44: "plate'" should be --plates'--.

Column 6, line 53: after "with" delete --b--.

Column 6, line 67: "⇌" should be -- " --.

Column 10, line 6: " $\alpha$ " should be --60--.

Column 11, Claim 9, line 24: after "comprising" insert

--50-60 weight percent high purity graphite powder and--.

Signed and Sealed this

Seventh Day of September 1982

[SEAL]

Attest:

GERALD J. MOSSINGHOFF

Attesting Officer

Commissioner of Patents and Trademarks